(12) United States Patent
Satoh et al.

(10) Patent No.: US 6,187,883 B1
(45) Date of Patent: Feb. 13, 2001

(54) SOLID CATALYST COMPONENT FOR α-OLEFIN POLYMERIZATION, CATALYST FOR α-OLEFIN POLYMERIZATION, AND PROCESS FOR PRODUCING α-OLEFIN POLYMER

(75) Inventors: Makoto Satoh; Teruyoshi Kiyota; Akio Imai, all of Ichihara (JP)

(73) Assignee: Sumitomo Chemical Company, Limited, Osaka (JP)

( * ) Notice: Under 35 U.S.C. 154(b), the term of this patent shall be extended for 0 days.

(21) Appl. No.: 08/910,830

(22) Filed: Aug. 13, 1997

(30) Foreign Application Priority Data

Aug. 23, 1996 (JP) .................................................. 8-222139
Nov. 29, 1996 (JP) .................................................. 8-320471

(51) Int. Cl.[7] ...................................................... C08F 4/44
(52) U.S. Cl. ................................. 526/125.3; 526/124.3; 526/124.9; 526/128; 526/908; 502/116; 502/125; 502/126; 502/127; 502/128
(58) Field of Search ..................................... 502/116, 125, 502/126, 127, 128; 526/124.3, 124.9, 125.3, 908, 128

(56) References Cited

U.S. PATENT DOCUMENTS

| | | | |
|---|---|---|---|
| 4,259,466 | * | 3/1981 | Kortbeek et al. ............... 526/908 |
| 4,302,565 | | 11/1981 | Goeke et al. . |
| 4,315,999 | | 2/1982 | Matsuura et al. . |
| 4,521,573 | * | 6/1985 | Lee et al. ..................... 526/908 |
| 4,542,198 | * | 9/1985 | Mayr et al. ................... 526/908 |
| 4,672,050 | | 6/1987 | Sasaki et al. . |
| 4,983,561 | | 1/1991 | Sasaki et al. . |
| 5,130,284 | | 7/1992 | Terano et al. . |
| 5,608,018 | | 3/1997 | Ebara et al. . |
| 5,859,143 | * | 1/1999 | Tanaka et al. ................. 525/247 |

FOREIGN PATENT DOCUMENTS

| | | |
|---|---|---|
| 0244678 | 11/1987 | (EP) . |
| 0459009 | 12/1991 | (EP) . |
| 56-047407 | 4/1981 | (JP) . |
| 03207702 | 9/1991 | (JP) . |
| 03210306 | 9/1991 | (JP) . |
| 03212406 | 9/1991 | (JP) . |
| 03221507 | 9/1991 | (JP) . |
| 03227309 | 10/1991 | (JP) . |
| 03259904 | 11/1991 | (JP) . |
| 04008709 | 1/1992 | (JP) . |
| 04037084 | 6/1992 | (JP) . |

OTHER PUBLICATIONS

WPI Abstract of JP A 54148093 corresponding to United States Patent 4,302,565.

* cited by examiner

Primary Examiner—David W. Wu
Assistant Examiner—R. Rabago
(74) Attorney, Agent, or Firm—Stevens, Davis, Miller & Mosher, L.L.P.

(57) ABSTRACT

The present invention relates to a solid catalyst component for α-olefin polymerization having a narrow particle size distribution of not less than 6.0 in terms of the value of N in a Rosin-Rammler function of particle size distribution and giving a catalytic activity of not less than 10,000 ((g-polymer produced/g-solid catalyst component)/hour) in polymerization. The catalyst component is obtained by a process which comprises reducing a titanium compound with an organomagnesium compound in the presence of an organosilicon compound and an ester to obtain a solid product, then treating the solid product with: (a) a mixture of titanium tetrachloride and an ether, (b) an organic acid halide, and (c) a mixture of titanium tetrachloride and an ether optionally containing an ester.

10 Claims, No Drawings

SOLID CATALYST COMPONENT FOR α-OLEFIN POLYMERIZATION, CATALYST FOR α-OLEFIN POLYMERIZATION, AND PROCESS FOR PRODUCING α-OLEFIN POLYMER

BACKGROUND OF THE INVENTION

1. Field of the Invention

The present invention relates to a solid catalyst component for α-olefin polymerization. More specifically, the present invention relates to a solid catalyst component for α-olefin polymerization having a narrow particle size distribution and high catalytic activity, a catalyst for α-olefin polymerization comprising said solid catalyst component and a process for producing poly-α-olefins with said catalyst.

2. Description of the Related Arts

As is well known, the ziegler-Natta catalyst comprising a transition metal compound (IV to VI Groups) and an organometallic compound (I, II and XIII Groups) is used for producing isotactic polymers of an α-olefin such as propylene, 1-butene or the like.

For the improved operability, it is desirable to produce poly-α-olefins having a substantially uniform particle diameter and being free from fine powder. Catalyst residues deriving from the transition metal compound and the organometallic compound remain in the resulting poly-α-olefins. An equipment for removal of the catalyst residue is required for removal and deactivation of the catalyst residue, which arises various adverse effects on the stability and processability of poly-α-olefins, and the like.

the problem of the catalyst residue is solved by increasing the catalytic activity, which is defined as the weight of the produced poly-α-olefin per unit weight of the catalyst. This method does not require any special equipment for removal of the catalyst residue, and reduces the production cost of poly-α-olefins. The catalyst having extremely high catalytic activity is required to enable a deashing-free process that is industrially advantageous.

The higher catalytic activity, however, decreases the bulk density of the resulting polymer particles. Therefore, a catalyst having a high activity and giving polymers of high bulk density and favorably particle properties, is required. Development of the solid catalyst component having the favorable particle properties and high polymerization activity has been attempted because the particle properties of the resulting polymers significantly depend upon the particle properties of the solid catalyst component.

With respect to an improvement the particle properties and narrowing the distribution of particle size, in polymerization of ethylene, there are proposed uses of a solid catalyst component preparing by supporting a titanium-magnesium compound on a silica gel carrier to overcome the problems (JP-A-148093 and JP-A-56-47407). It is also disclosed in JP-A-62-256802 that, in polymerization of propylene, particle properties of the resulting polypropylene are markedly improved by using the solid catalyst component obtained by soaking a titanium-magnesium compound in silica gel as a carrier.

Although improving the particle properties to some extent, these proposed catalysts have relatively low activity and cause a large amount of silica gel used as the carrier to contaminate in the final products. The contaminated silica gel deteriorates the quality of final products and causes fish eye in film products.

A variety of solid catalyst components having a high catalytic activity have also been proposed.

By way of example, it is known that a Ti-Mg complex-type solid catalyst, which is obtained by reducing a tetravalent titanium compound with an organomagnesium compound in the presence of an organosilicon compound to obtain an eutectic crystal of magnesium and titanium, is used in combination with an organoaluminum compound as a co-catalyst and an organosilicon compound as a third component to realize α-olefin polymerization of relatively high stereoregularity and high activity (JP-B-03-43283) and JP-A-01-319508). Another proposed technique shows that coexistence of an ester in the reduction of a tetravalent titanium compound with an organomagnesium compound in the presence of an organosilicon compound further improves polymerization of higher stereoregularity and higher activity (JP-A-216017).

Although these proposed techniques realize an extraction-free and deashing-free process, further improvement in particle properties of the resulting polymers is desired.

SUMMARY OF THE INVENTION

An object of the present invention is to provide a solid catalyst component for α-olefin polymerization, which has a high catalytic activity and a narrow distribution of particle size, contains less fine powder and is capable of giving a poly-α-olefin having a high bulk density and favorable particle properties efficiently.

Another object of the present invention is to provide a solid catalyst component for α-olefin polymerization and a solid for α-olefin polymerization, which give a poly-α-olefin having a high stereoregularity in addition to the above advantages, as well as a process for producing a poly-α-olefin of favorable particle properties with said catalyst.

According to the present invention, there is provided a solid catalyst component for α-olefin polymerization having a particle size distribution of not less than 6.0 in terms of the value of N in a Rosin-Rammler function of particle size distribution and giving a catalytic activity of not less than 10,000 ((g-polymer produced/g-solid catalyst component)/hour) in polymerization.

The present invention further provides (A) a solid catalyst component for α-olefin polymerization containing a trivalent titanium compound, obtained by a process which comprises reducing a titanium compound represented by the general formula of $Ti(OR^1)_a X_{4-a}$ (wherein $R^1$ represents a hydrocarbon group having 1 to 20 carbon atoms; X represents a halogen atom; "a" is a number satisfying $0 \leq a \leq 4$) with an organomagnesium compound in the presence of an organosilicon compound having an Si-O bond and an ester to obtain a solid product, successively adding a mixture of an ether and titanium tetrachloride and an organic acid halide in this sequence to the solid product for treatment, and further treating the treated solid product with a mixture of an ether and titanium tetrachloride or a mixture of an ether, titanium tetrachloride and an ester.

The present invention also provides a catalyst for α-olefin polymerization comprising:

(A) the solid catalyst component for α-olefin polymerization described above;

(B) an organoaluminum compound; and (C) an electron-donor compound.

The present invention further provides a process for producing a poly-α-olefin with said catalyst.

The present invention gives a poly-α-olefin having favorable particle properties. Preferably the present invention enables high stereoregular polymerization of an α-olefin.

The poly-α-olefin here means a homopolymer of an α-olefin or a copolymer of an α-olefin and another α-olefin or ethylene.

The present invention will be explained in detail below.

DETAILED DESCRIPTION OF THE INVENTION

There is described a solid catalyst component for α-olefin polymerization of the present invention, which was a particle size distribution of not less than 6.0 in terms of the value of N in a Rosin-Rammler function of particle size distribution and gives a catalytic activity of not less than 10,000 ((g-polymer produced/g-solid catalyst component)/hour) in polymerization.

The factor N in the Rosin-Rammler function of particle size distribution given below is generally known as an index representing the degree of the distribution of solid particle diameter (see Rosin, P. and E. Rammler: J. Inst. Fuel, 7, p29 (1933) and Handbook of Chemical Engineering, 3rd. ed. pp. 361–362):

$$R(Dp)=100 \exp \{-(Dp/De)^N\}$$

wherein R(Dp) represents a residual cumulative percentage; Dp represents a particle diameter; and De represents a particle diameter corresponding to [at] R(Dp)=36.8%. The larger N tends to narrow the particle size distribution. The solid catalyst component of the large N has a narrow particle size distribution and gives a polymer having a high bulk density and favorable particle properties and containing less fine powder, thereby being favorable in industrial. The value of N of solid catalyst component of the present invention is preferably not less than 6.2 or more, more preferably not less than 6.4.

The solid catalyst component has the catalytic activity of not less than 10,000, preferably not less than 15,000, more preferably not less than 20,000, and most preferably not less than 30,000 ((g-polymer produced/g-solid catalyst component)/hour).

The desirable catalyst of the present invention gives a poly-α-olefin of high stereoregularity.

Conditions of polymerization for determining the above catalytic activity are those adopted in Example 1 described below. In other words, the catalytic activity and bulk density can be determined by polymerizing propylene under the same conditions as in Example 1 except changing a solid catalyst component.

The solid catalyst component for α-olefin polymerization described above is preferably one produced by the following method.

The solid catalyst component of the present invention is a solid catalyst component for α-olefin polymerization containing a trivalent titanium compound, which is obtained by reducing a titanium compound represented by the general formula of $Ti(OR^1)_a X_{4-a}$ (wherein $R^1$ represents a hydrocarbon group of 1 to 20 carbon atoms; X represents a halogen atom; $0 \leq a \leq 4$) with an organomagnesium compound in the presence of an organosilicon compound having an Si-O bond and an ester to obtain a solid product, successively adding a mixture of an ether and titanium tetrachloride and an organic acid halide in this sequence to the solid product for treatment, and further treating the treated solid product with a mixture of an ether and titanium tetrachloride or a mixture of an ether, titanium tetrachloride and an ester.

The following describes the trivalent titanium compound-containing solid catalyst component for α-olefin polymerization in detail.

(a) Titanium compound

In the titanium compound represented by the general formula of $Ti(OR^1)_a X_{4-a}$ (wherein $R^1$ represents a hydrocarbon group having 1 to 20 carbon atoms; X represents a halogen atom; $0 \leq a \leq 4$), specific example of $R^1$ include alkyl groups having 1 to 20 carbon atoms such as methyl, ethyl, propyl, isopropyl, butyl, isobutyl, tert-butyl, amyl, isoamyl, tert-amyl, hexyl, heptyl, octyl, decyl, dodecyl and the like, aryl groups having up to 20 carbon atoms such as phenyl, cresyl, xylyl, naphthyl and the like, allyl groups such as propenyl and the like, and aralkyl groups having up to 20 carbon atoms such as benzyl and the like. Among these, alkyl groups having 2 to 18 carbon atoms and aryl groups of 6 to 18 carbon atoms are preferable. Linear alkyl groups having 2 to 18 carbon atoms are particularly preferred. Titanium compounds having two or more different $OR^1$ groups can be also used.

Examples of the halogen atom expressed by X include chlorine atom, bromine atom, and iodine atom. Especially preferable is chlorine atom.

The value of "a" in the titanium compound expressed by the general formula of $Ti(OR^1)_a X_{4-a}$ satisfies $0 \leq a \leq 4$, preferably $2 \leq a \leq 4$. Especially preferable is a=4.

Any known method is applicable for synthesis of the titanium compound expressed by the general formula of $Ti(OR^1)_a X_{4-a}$. Available methods include one for making $Ti(OR^1)_4$ and $TiX_4$ react with each other at a predetermined ratio and one for making $TiX_4$ react with a predetermined amount of the corresponding alcohol ($R^1OH$).

The titanium compound may be diluted with a hydrocarbon or a halogenated hydrocarbon.

The titanium compound expressed by the general formula of $Ti(OR^1)_a X_{4-a}$ include titanium tetrahalides such as titanium tetrachloride, titanium tetrabromide, titanium tetraiodide and the like, alkoxytitanium trihalides such as methoxytitanium trichloride, ethoxytitanium trichloride, butoxytitanium trichloride, phenoxytitanium trichloride, ethoxytitanium tribromide and the like, dialkoxytitanium dihalides such as dimethoxytitanium dichloride, diethoxytitanium dichloride, dibutoxytitanium dichloride, diphenoxytitanium dichloride, diethoxytitanium dibromide and the like, trialkoxytitanium monohalides such as trimethoxytitanium chloride, triethoxytitanium chloride, tributoxytitanium chloride, triphenoxytitanium chloride, triethoxytitanium bromide and the like, and tetraalkoxytitaniums such as tetramethoxytitanium, tetraethoxytitanium, tetrabutoxytitanium, tetraphenoxytitanium and the like.

(b) Organosilicon compound having Si-O bond

The organosilicon compound having an Si-O bond is, for example, expressed by one of the following general formulae:

$$Si(OR^2)_m R^3_{4-m};$$

$$R^4(R_2^5 SiO)_p SiR_3^6; \text{ or}$$

$$(R_2^7 SiO)_q$$

wherein $R^2$ represents a hydrocarbon group of 1 to 20 carbon atoms; $R^3$, $R^4$, $R^5$, $R^6$ and $R^7$ respectively represent a hydrocarbon group having 1 to 20 carbon atoms or hydrogen atom; $0 < m \leq 4$; p is an integer of 1 to 1000; and q is an integer of 2 to 1000.

Specified examples of the organosilicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetraporpoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tratraphenoxysilane, triethoxyphenylsilane, hexamethyldisiloxane, hexaethyldisiloxane, hexapropyldisiloxane, octaethyltrisiloxane, dimethylpolysiloxane, diephylopolysiloxane, methylhydropolysiloxane, phenylhydropolysiloxane and the like.

Among these organosilicon compounds, alkoxysilanes expressed by the general formula of $Si(OR^2)_m R_{4-m}^3$ are preferable, wherein $1 \leq m \leq 4$. Especially preferable are tetraalkoxysilanes, wherein m is 4.

(c) Ester

As an ester used in the present invention, there can be used organic acid esters, preferably mono-valent and poly-valent carboxylic acid esters including aliphatic carboxylic acid esters, alicyclic carboxylic acid esters, and aromatic carboxylic acid esters. Concrete examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methylethyl phthalate, diethyl phthalate, dipropyl phthalate, diisopropyl phthalate, dibutyl phthalate, diisobutyl phthalate, dioctyl phthalate, diphenyl phthalate and the like.

Among these esters, unsaturated aliphatic carboxylic acid esters such as methacrylates and maleates and phthalates are preferable. Especially preferable are phthalic diesters.

(d) Organomagnesium compound

Any organomagnesium compound having a magnesium-carbon bond can be used as the organomagnesium compound. Preferably used are Grignard compounds represented by the general formula of $R^8MgX$ (wherein $R^8$ represents a hydrocarbon group having 1 to 20 carbon atoms; and X represents a halogen atom) as well as dialkylmagnesium compounds and diarylmagnesium compounds represented by the general formula of $R^9R^{10}Mg$ (wherein $R^9$ or $R^{10}$ represents a hydrocarbon group having 1 to 20 carbon atoms). $R^8$, $R^9$ and $R^{10}$ individually represent alkyl groups having 1 to 20 carbon atoms such as methyl, ethyl, propyl, isopropyl, butyl, sec-butyl, amyl, isoamyl, hexyl, octyl, 2-ethylhexyl and the like, aryl groups having up to 20 carbon atoms such as phenyl and the like, aralkyl groups having up to 20 carbon atoms such as benzyl and alkenyl groups having up to 20 carbon atoms as vinyl and propenyl, and may be the same or different.

Concrete examples of the Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, phenylmagnesium chloride, and phenylmagnesium bromide. Examples of the compound expressed by the general formula of $R^9R^{10}Mg$ include dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dihexylmagnesium, diphenylmagnesium, butylethylmagnesium and the like.

Solvents generally used for the synthesis of the above organomagnesium compounds are ether solvents such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran. Hydrocarbon solvents such as hexane, heptane, octance, cyclohexane, methylcyclohexane, benzene, toluene and xylene, and mixed solvents of ether solvents and hydrocarbon solvents are also available.

The organomagnesium compound is preferably used in the form of an ether solution. Favorable examples of the ether used here include ethers having six or more carbon atoms in the molecule and ethers having the cyclic structure. Ether solutions of the Grignard compounds represented by the general formula of $R^8MgX$ are especially preferable from the viewpoint of the catalytic performance.

A hydrocarbon-soluble complex of the above organomagnesium compound with an organometallic compound is also available. Examples of the organometallic compound include organic compounds of Li, Be, B, Al and Zn.

(e) Ether

An ether used in the invention preferably includes di-$C_{1-10}$alkyl ethers. Examples of the dialkyl ether include diethyl ether, dipropyl ether, diisopropyl ether, dibutyl ether, diisobutyl ether, diamyl ether, diisoamyl ether, dineopentyl ether, dihexyl ether, dioctyl ether, methylbutyl ether, methylisoamyl ether, and ethylisobutyl ether. Among these examples, especially preferable are dibutyl ether and diisoamyl ether.

(f) Organic acid halide

Mono-valent and poly-valent carboxylic acid halides including aliphatic carboxyl halides, alicyclic carboxyl halides, and aromatic carboxyl halides can be used as the organic acid halide. Concrete examples include acetyl chloride, propionyl chloride, butyroyl chloride, valeroyl chloride, acryloyl chloride, methacryloyl chloride, benzoyl chloride, toluyl chloride, anisyl chloride, succinyl chloride, malonyl chloride, maleyl chloride, itaconoyl chloride, and phthaloyl chloride.

Among these organic acid halides, aromatic carboxylic acid halides such as benzoyl chloride, toluyl chloride, phthaloyl chloride and the like are preferred. Especially preferable is phthaloyl chloride.

(g) Synthesis of solid catalyst component

The trivalent titanium compound-containing solid catalyst component is obtained by reducing the titanium compound with the organomagnesium compound in the presence of the organosilicon compound and the ester to obtain a solid product, successively adding a mixture of the ether and titanium tetrachloride and the organic acid halide in this sequence to the solid product for treatment, and further treating the treated solid product with a mixture of the ether and titanium tetrachloride or a mixture of the ether, titanium tetrachloride, and the ester. All of these reactions are carried out under an atmosphere of an inert gas such as nitrogen or argon.

Reduction of the titanium compound with the organomagnesium compound may be implemented by adding the organomagnesium compound to a mixture of the titanium compound, the organosilicon compound and the ester, or on the contrary, by adding a mixture of the titanium compound, the organosilicon compound and the ester to a solution of the organomagnesium compound. The method of adding the organomagnesium compound to a mixture of the titanium compound, the organosilicon compound and the ester is preferable from the viewpoint of the catalytic activity.

It is preferable that the titanium compound, the organosilicon compound and the ester are dissolved in or diluted with an appropriate solvent. Preferable examples of the solvent include: aliphatic hydrocarbons such as hexane, heptane, octane, decane and the like; aromatic hydrocarbons such as toluene, exylene and the like; alicyclic hydrocarbons such as cyclohexane, methylcyclohexane, decalin and the like; and ethers such as diethyl ether, dibutyl ether, diisoamyl ether, tetrahydrofuran and the like.

The temperature of the reduction is generally in the range of −50 to 70° C., preferably in the range of −30 to 50° C., and more preferably in the range of −25 to 35° C. for the desired activity of the resulting solid catalyst.

A porous substance such as an inorganic oxide or an organic polymer, may coexist in the reduction, so that the solid product is impregnated with the porous substance. The preferable porous substance has a pore volume in the pore radius range of 20 to 200 nm of not less than 0.3 ml/g and a mean particle diameter of 5 to 300 $\mu$m.

Examples of the porous inorganic oxide include $SiO_2$, $Al_2O_3$, MgO, $TiO_2$, $ZrO_2$, $SiO_2(Al_2O_3$ complex oxide, MgO ($Al_2O_3$ complex oxide, and MgO($SiO_2(Al_2O_3$ complex oxide. Examples of the porous polymer include polystyrenes such as polystryene, styrene-divinylbenzene copolymer, styrene-n,n'-alkylene dimethacrylamide copolymer, styrene-ethylene glycol methyl dimethacrylate copolymer and ethylvinylbenzene-divinylbenzene copolymer, poly(meth) acrylates such as poly(ethyl acrylate), methyl acrylate-divinylbenzene copolymer, ethyl acrylate-divinylbenzene copolymer, poly(methyl methacrylate), methyl methacrylate-divinylbenzene copolymer and poly(ethylene glycol methyl dimethyacrylate), polyacrylonitriles such as polyacrylonitrile and acrylonitrile-divinylbenzene copolymer, poly(vinyl chlorides) such as poly(vinyl chloride), polyolefins such as polyethylene, ethylene-methyl acrylate copolymer and polypropylene, poly(vinyl pyrrolidine), poly(vinyl pyridine) and the like. Among these porous substances, $SiO_2$, $Al_2O_3$ and styrene-divinylbenzene copolymer are generally used.

The time of dropwise addition is not specifically restricted, but is usually about 30 minutes to about 12 hours. After completion of the reduction, post-reaction may be carried out at the temperature of 20 to 120° C.

The amount of the organosilicon compound used is generally in the range of 1 to 50, preferably in the range of 3 to 30, and more preferably in the range of 5 to 25 in terms of an atomic ratio of silicon atom to titanium atom contained in the titanium compound (Si/Ti). The amount of the ester used is generally in the range of 0.05 to 10, preferably in the range of 0.1 to 6, and more preferably in the range of 0.2 to 3 in terms of a molar ratio of ester to titanium atom contained in the titanium compound (ester/Ti). The amount of the organomagnesium compound used is generally in the range of 0.1 to 10, preferably in the range of 0.2 to 5.0, and more preferably in the range of 0.5 to 2.0 in terms of an atomic ratio of the sum of titanium atom and silicon atoms to magnesium atom (Ti+Si/Mg).

The solid product obtained by the reduction is subjected to solid-liquid separation and washed several times with an inert hydrocarbon solvent such as hexane, heptane or the like. The reduced solid product thus obtained contains trivalent titanium, magnesium, and a hydrocarbyloxy group and generally shows non-crystallinity or extremely weak crystallinity. The non-crystalline structure is especially preferable from the viewpoint of the catalytic performance.

The mixture of the ether and titanium tetrachloride and the organic acid halide are added successively in this sequence to the reduced solid product for treatment. Use of the organic acid halide decreases the amount of a cold xylene-soluble part, which is an amorphous polymer of less industrial value, and improves the polymerization activity and the bulk density of the polymer particles as well as the productivity.

The amount of the ether is generally 0.1 to 100 moles, preferably 0.5 to 50 moles, and more preferably 1 to 20 moles per 1 mole of a titanium atom contained in the reduced solid product. The amount of titanium tetrachloride is generally 1 to 1000 moles, preferably 3 to 500 moles, and more preferably 10 to 300 moles per 1 mole of the titanium atom contained in the reduced solid product. The amount of titanium tetrachloride per 1 mole of the ether is generally 1 to 100 moles, preferably 1.5 to 75 moles, and more preferably 2 to 50 moles. The amount of the organic acid halide is generally 0.1 to 50 moles, preferably 0.3 to 20 moles, and more preferably 0.5 to 10 moles per 1 mole of the titanium atom included in the reduced solid product. The amount of the organic acid halide per 1 mole of magnesium atoms included in the solid product is generally 0.01 to 1.0 moles and preferably 0.03 to 0.5 moles. The use of the excess amount or the organic acid halide sometimes causes degradation of particles.

Treatment of the reduced solid product with a mixture of the ether and titanium tetrachloride and the organic acid halide may be implemented by any known method of bringing these additives into contact with the solid product, for example, by a slurry method or by mechanical pulverization means such as a ball mill. The slurry method capable of bringing the additives into contact with the solid product in the presence of a diluent is, however, preferable for the production of the solid catalyst component having a narrow particle size distribution.

Examples of the diluent include: aliphatic hydrocarbons such as pentane, hexane, heptane, octane and the like; aromatic hydrocarbons such as benzene, toluene, xylene and the like; alicyclic hydrocarbons such as cyclohexane, cyclopentane and the like; halogenated hydrocarbons such as 1,2-dichloroethane, monochlorobenzene and the like. Among these examples, aromatic hydrocarbons and halogenated hydrocarbons are especially preferable.

The amount in volume of the diluent used is generally 0.1 ml to 1000 and preferably 1 ml to 100 ml per 1 g of the reduced solid product. The treatment temperature is generally in the range of −50° to 150° C. and preferably in the range of 0 to 120° C. The treatment time is generally 30 minutes or more, preferably 1 to 10 hours. After completion of the treatment, the treated solid product is allowed to stand for solid-liquid separation and washed several times with an inert hydrocarbon solvent thereby obtaining an organic acid halide-treated solid product.

The organic acid halide-treated solid product thus obtained is further treated with either a mixture of the ether and titanium tetrachloride or a mixture of the ether, titanium tetrachloride and the ester. The treatment is preferably performed in the form of slurry. Available solvents for preparation of slurry include: aliphatic hydrocarbons such as pentane, hexane, heptane, octane, decane and the like; aromatic hydrocarbons, such as toluene and xylene; alicyclic hydrocarbons such as cyclohexane, methylcyclohexane, decalin and the like; and halogenated hydrocarbons such as dichloroethane, trichloroethylene, monochlorobenzene, dichlorobenzene, trichlorobenzene and the like. Among these solvents, halogenated hydrocarbons and aromatic hydrocarbons are preferable.

The concentration of the slurry is generally in the range of 0.05 to 0.7 (g-solid/ml-solvent) and preferably in the range of 0.1 to 0.5 (g-solid/ml-solvent). The reaction temperature is generally in the range of 30 to 150° C. preferably in the range of 45 to 135° C., and more preferably in the range of 60 to 120° C. The reaction time is not specifically limited but generally 30 minutes to 6 hours.

The treatment of the organic acid halide-treated solid product with the ester, the ether and titanium tetrachloride may be implemented by adding the ester, the ether and titanium tetrachloride to the organic acid halide-treated solid product or, on the contrary, by adding the organic acid halide-treated solid product to a mixed solution of the ester, the ether and titanium tetrachloride. In the former process of adding the ester, the ether and titanium tetrachloride to the organic acid halide-treated solid product, it is preferable to add titanium tetrachloride after addition of the ester and ether or to add the ester, the ether and titanium tetrachloride simultaneously. It is especially preferable to add a mixture of the ester, the ether and titanium tetrachloride that has been prepared in advance to the organic acid halide-treated solid product.

Treatment of the organic acid halide-treated solid product with either a mixture of the ether and titanium tetrachloride or a mixture of the ester, the ether and titanium tetrachloride may be carried out repeatedly. It is preferably to repeat the treatment at least two times for the better catalytic activity and the stereoregularity.

The amount of the ether used is generally 0.1 to 100 moles, preferably 0.5 to 50 moles, and more preferably 1 to 20 moles per 1 mole of the titanium atom contained in the organic acid halide-treated solid product. The amount of titanium tetrachloride used is generally 1 to 1000 moles, preferably 3 to 500 moles, and more preferable 10 to 300 moles per 1 mole of the titanium atom contained in the organic acid halide-treated solid product. The amount of titanium tetrachloride per 1 mole of the ether is generally 1 to 100 moles, preferably 1.5 to 75 moles, and more preferably 2 to 50 moles.

In case that the ester coexists, the amount of the ester used is generally not more than 30 moles, preferably not more than 15 moles, and more preferably not more than 5 moles per 1 mole of the titanium atom contained in the organic acid halide-treated solid product.

The solid catalyst component thus obtained is subjected to solid-liquid separation and washed several times with an inert hydrocarbon solvent, such as hexane, heptane or the like prior to use for polymerization. In order to attain the better catalytic activity and stereoregularity, there is preferably adopted a method which comprises washing the solid catalyst component after the solid-liquid separation with a large amount of a halogenated hydrocarbon solvent such as monochlorobenzene or the like, or an aromatic hydrocarbon solvent such as toluene or the like, once or a plurality of times at the temperature of 50 to 120° C., and subsequently washing several times the solid catalyst component with an aliphatic hydrocarbon solvent such as hexane or the like, followed by using the solid catalyst component for polymerization.

The solid catalyst component for α-olefin polymerization (A) thus obtained is combined with the components (B) and (C) described above to give a solid catalyst for α-olefin polymerization. The resulting catalyst has a high polymerization activity and gives a poly-α-olefin of high stereoregularity. The solid catalyst component thus obtained has a narrow particle size distribution, which is not less than 6.0, preferably not less than 6.2, or more preferably not less than 6.4 in terms of the value of N in the Rosin-Rammler function of particle size distribution.

The obtained solid catalyst component has the catalytic activity of not less than 10,000 ((g-polymer produced/g-solid catalyst component)/hour).

The solid catalyst component for α-olefin polymerization of the present invention is used in combination with appropriate co-catalyst components for polymerization of an α-olefin. This gives a poly-α-olefin having less fine powder and favorable particle properties. Typical examples of the co-catalyst components are organoaluminum compounds and electron-donor compounds, which are described in detail below.

(h) Organoaluminum compound

The organoaluminum compound has at least one aluminum-carbon bond in the molecule. Typical examples of the organoaluminum compound are those represented by the general formula given below:

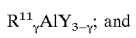

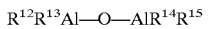

(wherein $R^{11}$ through $R^{15}$ represent hydrocarbon groups of 1 to 20 carbon atoms; Y represents a halogen, hydrogen, or an alkoxy group having 1 to 20 carbon atoms; $2 \leq \gamma \leq 3$).

Concrete examples of the organoaluminum compound include: trialkylaluminums such as triethyaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures of trialkylaluminums and dialkylaluminum halides such as a mixture of triethyluminum and diethylaluminum chloride and the like; and alkylalumoxanes such as tetraethyldialumoxane, tetrabutyldialumoxane and the like.

Among these organoaluminum compounds, trialkyaluminums, mixtures of trialkylaluminums and dialkylaluminum halides and alkylalumoxanes are preferable. Especially preferable are triethylaluminum, triisobutylaluminum, a mixture of triethylaluminum and diethylaluminum chloride, and tetraethyldialumoxane.

The amount of the organoaluminum compound is generally in the wide range of 0.5 to 1000 moles, but is preferably in the range of 1 to 600 moles per 1 mole of the titanium atom contained in the solid catalyst component.

(i) Electron-donor compound

Available examples of the electron-donor compound include: oxygen-containing electron donors such as alcohols, phenols, ketones, aldehydes, carboxylic acids, esters of organic acids or inorganic acids, ethers, acid amides, acid anhydrides and the like; and nitrogen-containing electron donors such as ammonia, amines, nitriles, isocyanates and the like. Among these electron donors, esters of inorganic acids and ethers are preferably used.

The esters of inorganic acids are preferably silicon compounds represented by the general formula of $R^{16}{}_n Si(OR^{17})_{4-n}$ (wherein $R^{16}$ represents a hydrocarbon group of 1 to 20 carbon atoms or hydrogen atom; $R^{17}$ represents a hydrocarbon group of 1 to 20 carbon atoms; $R^{16}$ and $R^{17}$ may be the same or different in the same ether molecule; "n" represents a numeral satisfying $0 \leq n < 4$). Concrete examples include tetramethoxysilane, tetraethoxysilane, tetrabutoxysilane, tetraphenoxysilane, methyltriemethoxysilane, ethyltriemethoxysilane, butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-tert-butyldimethoxysilane, butylmethyldimethoxysilane, butylethyldimethoxysilane, tert-butylmethyldimethoxysilane, isobutylisopropyldimethoxysilane, tert-butylisopropyldimethoxysilane, hexylmethyldimethoxysilane, hexylethyldimethoxysilane, dodecylmethyldimethoxysilane, dicyloclopehtyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclophexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, vinylmethyldimethoxysilane, methyltriethoxysilane, ethyltriethoxysilane, butyltriethoxysilane, isobutyltriethoxysilane, tert-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-tert-butyldiethoxysilane, butylmethyldiethoxysilane, butylethyldiethoxysilane, tert-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-tert-butoxysilane, 2-norbornanetrimethoxysilane, 2-norbornanetriethoxysilane, 2-norbornanemethyldimethoxysilane, trimethylphenoxysilane, methyltriallyloxysilane and the like.

The ethers are preferably di-$C_{1-20}$alkyl ethers or diethers represented by the general formula:

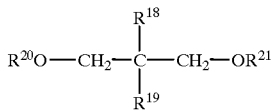

(wherein $R^{18}$ through $R^{21}$ represent a linear or branched alkyl group of 1 to 20 carbon atoms or an aliphatic hydrocarbon, aryl or aralkyl group up to 20 carbon atoms; $R^{18}$ or $R^{19}$ may be hydrogen).

Concrete examples include diethyl ether, dipropyl ether, diisopropyl ether, dibutyl ether, diamyl ether, diisoamyl ether, dineopentyl ether, dihexyl ether, dioctyl ether, methylbutyl ether, methylisoamyl ether, ethylisobutyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2,3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, and 2-heptyl-2-pentyl-1,3-dimethoxypropane.

Among these electron-donor compounds, organosilicon compounds represented by the general formula of $R^{22}R^{23}Si(OR^{24})_2$ are especially preferable. In the general formula, $R^{22}$ represents a hydrocarbon group of 3 to 20 carbon atoms having a secondary or tertiary carbon atom adjacent to Si. Concrete examples of $R^{22}$ include: branched alkyl groups such as isopropyl, sec-butyl, tert-butyl, tert-amyl and the like; cycloalkyl groups such as cyclopentyl, cyclohexyl and the like; cycloalkenyl groups such as cyclopentenyl and the like; and aryl groups such as phenyl, tolyl and the like. $R^{23}$ represents a hydrocarbon group of 1 to 20 carbon atoms, and concrete examples of $R^{23}$ include: linear alkyl groups such as methyl, ethyl, propyl, butyl, pentyl and the like; branched alkyl groups such as isopropyl, sec-butyl, tert-butyl, tert-amyl and the like; cycloalkyl groups such as cyclopentyl, cyclohexyl and the like; cycloalkenyl groups such as cyclopentenyl and the like; and aryl groups such as phenyl, tolyl and the like. $R^{24}$ represents a hydrocarbon group having 1 to 20 carbon atoms and preferably a hydrocarbon group having 1 to 5 carbon atoms.

Concrete examples of the organosilicon compound used as the electron-donor compound include diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, and 2-norbornanmethyldiethoxysilane.

(j) Polymerization of olefin

The α-olefin applicable for the present invention is α-olefins having 3 or more, preferably 3 to 10 carbon atoms. Concrete examples the olefin include: linear monoolefins such as propylene, 1-butene, 1-pentene, 1-hexane, 1-heptene, 1-octene, 1-decene and the like; branched monoolefins such as 3-methyl-1-butene, 3-methyl-1-pentene, 4-methyl-1-pentene and the like; vinylcylohexane, and the like. The α-olefins may be used alone or in combination of 2 or more kinds for polymerization. Among these α-olefins, homopolymerization of propylene or 1-butene and copolymerization of an olefin mixture including propylene or 1-butene as a main component are preferable. Especially preferable are homopolymerization of propylene and copolymerization of an olefin mixture including propylene as a main component. A mixture of ethylene and two or more olefins selected from the above α-olefins may be applied for copolymerization in the present invention. A polyene compound such as conjugated diene and non-conjugated diene, may also be used in copolymerization. Hetero-block copolymerization, wherein polymerization is carried out in two or more stages, can be easily conducted.

The feeding of the respective catalyst components to a polymerizer is not specifically restricted, except that these catalyst components should be supplied under a water-free condition in an inert gas such as nitrogen or argon.

The solid catalyst component, the organoaluminum compound and the electron-door compound may be supplied. independently, or alternatively any two of them may be mixed together prior to the supply.

Polymerization of the olefin can be carried out in the presence of the above catalyst. Preliminary polymerization described below may be carried out prior to such polymerization (main polymerization).

The preliminary polymerization is carried out by feeding an olefin in a small amount in the presence of the solid catalyst component and the organoaluminum compound. The preliminary polymerization is preferably carried out in the state of slurry. Available solvents for preparation of slurry are inert hydrocarbons such as propane, butane, isobutane, pentane, isopentane, hexane, heptane, octane, cyclohexane, benzene, toluene and the like. A part or the whole of the inert hydrocarbon solvent used for preparation of slurry may be replaced with a liquid olefin.

The amount of the organoaluminum compound used for preliminary polymerization is generally in the wide range of 0.5 to 700 moles, but preferably in the range of 0.8 to 500 moles and more preferably in the range of 1 to 200 moles per 1 moles of the titanium atom contained in the solid catalyst component.

The amount of the olefin to be preliminary polymerized is generally 0.01 to 1000 g, preferably 0.05 to 500 g and more preferably 0.1 to 200 g per 1 g of the solid catalyst component.

The concentration of slurry for preliminary polymerization is preferably 1 to 500 g(solid catalyst component)/liter (solvent) and more preferably 3 to 300 g(solid catalyst component)/liter(solvent). The temperature of preliminary polymerization is preferably in the range of −20° to 100° C. and more preferably in the range of 0° to 80° C. The partial pressure of the olefin in the gas phase during preliminary polymerization is preferably 0.01 to 20 kg/cm$^2$ and more preferably 0.1 to 10 kg/cm$^2$; however, this does not apply to the olefin which is liquid at the temperature and pressure in the preliminary polymerization. The preliminary polymerization time is not specifically restricted but is generally in the range of 2 minutes to 15 hours.

The feeding of the solid catalyst component, the organoaluminum compound and the olefin in preliminary polymerization may be effected either by a method in which the olefin is fed after the solid catalyst component has been contacted with the organoaluminum compound or by a method in which the organoaluminum compound is fed after the solid catalyst compound has been contacted with the olefin. The feeding of the olefin may be continuously fed while the pressure in the polymerizer is kept to a predetermined level. Alternatively the whole of the predetermined amount of the olefin may be fed initially. In order to adjust the molecular weight of the resulting polymer, a chain transfer agent such as hydrogen or the like, may be added.

The electron-donor compound may be, if necessary, added, while a small amount of the olefin is preliminarily polymerized in the presence of the solid catalyst component and the organoaluminum compound. A part or the whole of the electron-donor compound described above may be used as the electron-donor compound here. The amount of the electron-donor compound used is generally 0.01 to 400 moles, preferably 0.02 to 200 moles, and more preferably 0.03 to 100 moles per 1 mole of the titanium atom contained in the solid catalyst compound, and is generally 0.003 to 5 moles, preferably 0.005 to 3 moles, and more preferably 0.01 to 2 moles per 1 mole of the organoluminum compound.

The method of feeding the electron-donor compound for preliminary polymerization is not specifically restricted. The electron-donor compound may be fed separately from the organoaluminum compound or may be previously contacted with the organoaluminum compound and then fed. The olefin used in preliminary polymerization may be the same as or different from the olefin to be used in the main polymerization.

After the preliminary polymerization or without the preliminary polymerization, main polymerization of the α-olefin can be carried out in the presence of the catalyst for α-olefin polymerization, which comprises the solid catalyst component, the organoaluminum compound and the electron-donor compound described above.

The amount of the organoaluminum compound used for main polymerization is generally in the wide range of 1 to 1000 moles, but preferably in the range of 5 to 600 moles per 1 mole of the titanium atom contained in the solid catalyst component.

The amount of the electron-donor compound used in main polymerization is generally 0.1 to 2000 moles, preferably 0.3 to 1000 moles, and more preferably 0.5 to 800 moles per 1 mole of the titanium atom contained in the solid catalyst component, and is generally 0.001 to 5 moles, preferably 0.005 to 3 moles, and more preferably 0.01 to 1 mole per 1 mole of the organoaluminum compound.

The main polymerization temperature is generally in the range of −30° to 300° C. and preferably in the range of 20 to 180° C. The polymerization pressure is not specifically restricted, but generally the ordinary pressure to 100 kg/cm$^2$ or preferably the pressure of 2 to 50 kg/cm$^2$ is adopted from the industrial and economical points of view. Both of the batch and flow systems are applicable for polymerization. Also available are slurry polymerization with an inert hydrocarbon solvent such as propane, butane, isobutane, pentane, hexane, heptane, octane and the like, solution polymerization, bulk polymerization using as a medium an olefin which is liquid at the polymerization temperature, and gas phase polymerization.

In the main polymerization, a chain transfer agent such as hydrogen or the like, may be added in order to adjust the molecular weight of the polymer produced.

EXAMPLE

The present invention is further described in detail with examples and comparative examples, but limited thereto. In the Examples, physical properties of polymers were evaluated as described below.

(1) Xylene soluble portion at 20° C. (hereinafter referred to as CXS)

One gram of polymer powder is dissolved in 200 ml of boiled xylene. The solution is gradually cooled to 50° C. and further cooled in iced water with stirring to 20° C. After the solution is allowed to stand at 20° C. for 3 hours, a polymer precipitated is filtered out. The filtrate is evaporated for removal of xylene. The residue is dried under reduced pressure at 60° C., and the polymer that is soluble in 20° C. xylene is collected and weighed. The weight ratio of the polymer xylene soluble at 20° C. to the whole polymer is calculated (% by weight). The smaller CXS indicates less amorphous polymer and higher stereoregularity.

(2) Intrinsic viscosity (hereinafter referred to as $[\eta]$)

The intrinsic viscosity is measured in tetralin at 135° C. with an Ubbelohde viscometer.

(3) N in Rosin-Rammler function of particle size distribution

The distribution of particle size is measured with an ultra centrifugal-type automatic particle size distribution analyzer CAPA-700 (manufactured by Horiba Ltd.) The data obtained are processed by the Rosin-Rammler function of particle size distribution given below (se Rosin, P. and E. Rammler: J. Inst. Fuel, 7, p29 (1933) and Handbook of Chemical Engineering, 3rd. ed. pp. 361–362):

$$R(Dp)=100\exp\{-(Dp/De)N\}$$

wherein R(Dp) represents a distribution of residual ratio and is given as a residual ratio curve, which shows the ratio of the total weight of larger particles than a predetermined particle diameter Dp to the whole weight plotted against the particle diameter; and De represents a particle diameter at R(Dp)=36.8%. The larger N tends to narrow the particle size distribution. The solid catalyst component of the large N has a narrow particle size distribution and gives a polymer having the high bulk density favorable in industry.

Example 1

(a) Synthesis of reduced solid product

The atmosphere in a 500 ml flask with a stirrer and a dropping funnel was replaced with nitrogen, and 290 ml of hexane, 8.9 ml (8.9 g: 26.1 mmol) of tetrabutoxytitanium, 3.1 ml (3.3 g: 11.8 mmol) of diisobutyl phthalate, and 87.4 ml (81.6 g: 392 mmol) of tetraethoxysilane were mixed in the flask to obtain a homogeneous solution. While the temperature in the flask was kept at 6° C., 199 ml of a dibutyl ether solution of butylmagnesium chloride (manufactured by Yukigosei Yakuhin K.K., concentration of butylmagnesium chloride: 2.1 mmol/ml) was added dropwise from the dropping funnel over 5 hours. After the dropwise addition, the solution was further stirred at 6° C. for one hour and at room temperature for an additional one hour. The solution was subjected to solid-liquid separation and washed three times with 260 ml of toluene. An adequate amount of toluene was then added to the solid product thus obtained to form a slurry having the concentration of 0.176 g/ml. A part of the solid product slurry was sampled for composition analysis. The result of composition analysis showed that the solid product contained 1.96% by weight of titanium atom, 0.12% by weight of phthalate, 37.2% by weight of ethoxy group and 2.8% by weight of butoxy group.

(b) Synthesis of solid catalyst component

The atmosphere in a 100 ml flask with a stirrer, a dropping funnel and a thermometer was replaced with nitrogen. After 52 ml of the solid product-containing slurry obtained in the step (a) was charged in the flask, 25.5 ml of the supernatant was taken from the slurry. A mixture of 0.80 ml (6.45 mmol) of butyl ether and 16.0 ml (0.146 mole) of titanium tetrachloride and subsequently 1.6 ml (11.1 mmol: 0.20 ml/1 g of solid product) of phthaloyl chloride were added to the slurry. The slurry was heated to 115° C. and stirred for three hours. After completion of the reaction, the slurry was subjected to solid-liquid separation and washed twice with 40 ml of toluene at the same temperature. A mixture of 10.0 ml of toluene, 0.45 ml (1.68 mmol) of diisobutyl phthalate, 0.80 ml (6.45 mmol) of butyl ether, and 8.0 ml (0.073 mole) of titanium tetrachloride was added to the product for one-hour treatment at 115° C. After completion of the reaction, the product was subjected to solid-liquid separation at the same temperature, washed three times with 40 ml of toluene, and another three times with 40 ml of hexane at room temperature, and dried under reduced pressure to obtain 7.36 g of a solid catalyst component. The solid catalyst component thus obtained contained 2.18% by weight of titanium atom, 11.37% by weight of phthalate, 0.3% by weight of ethoxy group, and 0.1% by weight of butoxy group. The solid catalyst component was observed with a substance microscope and showed favorable particle properties free from fine powder. The value of N is shown in Table 1.

(c) Polymerization of propylene

The atmosphere of a 3 liter stirring-type stainless steel autoclave was replaced with argon, 2.6 mmol of triethylaluminum, 0.26 mmol of cyclohexylethyldimethoxysilane and 5.7 mg of the solid catalyst component synthesized in the step (b) were charged into the autoclave, and hydrogen corresponding to a partial pressure of 0.33 kg/cm$^2$ was added thereto. After addition of 780 g of liquefied propylene, the autoclave was heated to the temperature of 80° C. and polymerization was carried out at 80° C. for one hour. After completion of the polymerization, the unreacted monomer was purged out. The obtained polymer was dried under reduced pressure at 60° C. for two hours, so as to obtain 231 g of polypropylene powder. Conditions and results of polymerization are shown in Table 1.

Comparative Example 1

(a) Synthesis of solid catalyst component

The reaction was carried out in the same manner as in the step (a) of Example 1 except the difference in volumes of the reagents: 7.5 ml (7.5 g: 22 mmol) of tetrabutoxytitanium, 2.5 ml (2.6 g: 9.3 mmol) of diisobutyl phthalate, 74.8 ml (70.3 g: 338 mmol) of tetraethoxysilane, and 173 ml of the solution of the organomagnesium compound. The solid product obtained by solid-liquid separation was washed three times with 300 ml of hexane and another three times with 300 ml of toluene, and 270 ml of toluene was then added to the washed solid product to form a slurry. A part of the solid product slurry was sampled for composition analysis. The result of composition analysis showed that the solid product contained 1.80% by weight of titanium atom, 0.1% by weight of phthalate, 35.0% by weight of ethoxy group, and 3.2% by weight of butoxy group.

(b) Synthesis of solid catalyst component

The atmosphere in a 200 ml flask with a stirrer, a dripping funnel, and a thermometer was replaced with argon. After 84 ml of the solid product-containing slurry obtained in the step (a) above was charged into the flask, 12.1 ml of the supernatant was taken from the slurry, and 7.8 ml (29 mmol) of diisobutyl phthalate was added to the slurry. The reaction proceeded at 95° C. for 30 minutes. The reaction product was subjected to solid-liquid separation and washed twice with 59 ml of toluene. Next, a mixture of 15.3 ml of toluene, 0.66 ml (2.5 mmol) of diisobutyl phthalate, 1.2 ml (6.9 mmol) of butyl ether and 23.4 (0.213 mole) of titanium tetrachloride was then added to the solid product in the flask for three-hour treatment at 105° C. After completion of the treatment, the reaction product was subjected to solid-liquid separation and washed twice with 59 ml of toluene at the same temperature. A mixture of 12.0 ml of toluene, 1.2 ml (6.9 mmol) of butyl ether, and 11.7 ml (0.106 mole) of titanium tetrachloride was then added to the solid product in the flask for one-hour treatment at 105° C. After completion of the treatment, the reaction product was subjected to solid-liquid separation at the same temperature, washed three times with 59 ml of toluene, and another three times with 59 ml of hexane at room temperature, and dried under reduced pressure to obtain 8.1 g of a solid catalyst component. The solid catalyst component thus obtained contained 1.5% by weight of titanium atom, 8.9% by weight of phthalate, 0.4% by weight of ethoxy group, and 0.1% by weight of butoxy group. The value of N is shown in Table 1.

(c) Polymerization of propylene

Propylene was polymerized in the same manner as in the step (c) of Example 1, except that 4.0 mg of the solid catalyst component obtained in the step (b) of Comparative Example 1 was used for polymerization. Conditions and results of polymerization are shown in Table 1.

Example 2

(c) Polymerization of propylene

Propylene was polymerized with the solid catalyst component prepared in the step (b) of Example 1 in the same manner as in the step (c) of Example 1, except that tert-butyl-n-propyldimethoxysilane was used in place of cyclohexylethyldimethoxysilane. Conditions and results of polymerization are shown in Table 1.

Example 3

(b) Synthesis of solid catalyst component

After 22.5 ml of the supernatant was taken from 46 ml of the solid product-containing slurry prepared in the step (a) of Example 1, a mixture of 0.71 ml (5.73 mmol) of butyl ether and 11.4 ml (0.104 mol) of titanium tetrachloride and subsequently 1.42 ml (9.86 mmol: 0.20 ml/1 g of solid product) of phthaloyl chloride were added to the slurry. The slurry was heated to 115° C. and stirred for three hours. After completion of the reaction, the slurry was subjected to solid-liquid separation and washed twice with 36 ml of toluene at the same temperature. A mixture of 9.0 ml of toluene, 0.40 ml (1.49 mmol) of diisobutyl phthalate, 0.71 ml (5.73 mmol) of butyl ether, and 5.7 ml (0.052 mole) of titanium tetrachloride was added to the product for one-hour treatment at 115° C. after completion of the reaction, the product was subjected to solid-liquid separation at the same temperature, washed three times with 36 ml of toluene and another three times with 36 ml of hexane at room temperature, and dried under reduced pressure to obtain 6.53 g of a solid catalyst component. The solid catalyst component thus obtained contained 2.34% by weight of titanium atom, 10.57% by weight of phthalate, 0.4% by weight of ethoxy group, and 0.1% by weight of butoxy group. The solid catalyst component was observed with a substance microscope and showed favorable particle properties free from fine powder. The value of N is shown in Table 1.

(c) Polymerization of propylene

Propylene was polymerized in the same manner as in the step (c) of Example 1, except that the solid catalyst component prepared in the step (b) of Example 3 was used. Conditions and results of polymerization are shown in Table 1.

Example 4

(b) Synthesis of solid catalyst component

The solid catalyst component was synthesized in the manner as in the step (b) of Example 1, except that 0.22 ml of diisobutyl phthalate was used. The solid catalyst component thus obtained contained 2.22% by weight of titanium atom, 10.20% by weight of phthalate, 0.37% by weight of ethoxy group, and 0.14% by weight of butoxy group. The solid catalyst component was observed with a substance microscope and showed favorable particle properties free from fine powder. The value of N is shown in Table 1.

(c) Polymerization of propylene

Propylene was polymerized in a similar manner to the step (c) of Example 1, except that the solid catalyst component obtained in the step (b) of Example 4 was used. Conditions and results of polymerization are shown in Table 1.

Example 5

(c) Polymerization of propylene

Propylene was polymerized in the same manner as in the step (c) of Example 4, except that tert-butyl-n-propyldimethoxysilane was used in place of cyclohexylethyldimethoxysilane. Conditions and results of polymerization are shown in Table 1.

Example 6

(a) Synthesis of reduced solid product

A solid product was synthesized in the same manner as in the step (a) of Example 1. The slurry concentration of the solid product thus obtained was 0.184 g/ml. A part of the solid product slurry was sampled for composition analysis. The result of composition analysis showed that the solid product contained 1.94% by weight of titanium atom, 0.18% by weight of phthalate, 34.6% by weight of ethoxy group, and 3.2% by weight of butoxy group.

(b) Synthesis of solid catalyst component

After 23.5 ml of the supernatant was taken from 50 ml of the solid product-containing slurry obtained in the step (a) above, a mixture of 0.80 ml (6.45 mmol) of butyl ether and 16.0 ml (0.146 mole) of titanium tetrachloride and subsequently 1.60 ml (11.1 mmol: 0.20 ml/1 g of solid product) of phthaloyl chloride were added to the slurry. The slurry was heated to 115° C. and stirred for three hours. After completion of the reaction, the slurry was subjected to solid-liquid separation and washed twice with 40 ml of toluene at the same temperature. A mixture of 10 ml of toluene, 0.45 ml (1.68 mmol) of diisobutyl phthalate, 0.80 ml (6.45 mmol) at 115° C. After completion of the treatment, the product was subjected to solid-liquid separation and washed twice with 40 ml of toluene at the same temperature. A mixture of 10 ml of toluene, 0.45 ml (1.68 mmol) of diisobutyl phthalate, 0.80 ml (6.45 mmol) of butyl ether, and 8.0 ml (0.073 mole) of titanium tetrachloride was then added to the product for one-hour treatment at 115° C. After completion of the reaction, the product was subjected to solid-liquid separation at the same temperature, washed three times with 40 ml of toluene and another three times with 40 ml of hexane at room temperature, and dried under reduced pressure to obtain 7.07 g of a solid catalyst component. The solid catalyst component thus obtained contained 2.13% by weight of titanium atom, 12.37% by weight of phthalate, 0.1% by weight of ethoxy group, and 0.1% by weight of butoxy group. The solid catalyst component was observed with a substance microscope and showed favorable particle properties free from fine powder. The value of N is shown in Table 1.

(c) Polymerization of propylene

Propylene was polymerized in a similar manner to the step (c) of Example 1, except that the solid catalyst component obtained in the step (b) of Example 6 was used. Conditions and results of polymerization are shown in Table 1.

Example 7

(b) Synthesis of solid catalyst component

After 23.5 ml of the supernatant was taken from 50 ml of the solid product-containing slurry obtained in the step (a) of Example 6, a mixture of 0.80 ml (6.45 mmol) of butyl ether and 16.0 ml (0.146 mol) of titanium tetrachloride and subsequently 1.60 ml (11.1 mmol:0.20 ml/1 g of solid product) of phthaloyl chloride were added to the slurry. The slurry was heated to 115° C. and stirred for three hours. After completion of the reaction, the slurry was subjected to solid-liquid separation and washed twice with 40 ml of toluene at the same temperature. A mixture of 10 ml of toluene, 0.45 ml (1.68 mmol) of diisobutyl phthalate, 0.80 ml (6.45 mmol) of butyl ether and 8.0 ml (0.073 mole) of titanium tetrachloride was added to the product for one-hour treatment at 115° C. After completion of the treatment, the product was subjected to solid-liquid separation and washed twice with 40 ml of toluene at the same temperature. A mixture of 10 ml of toluene, 0.80 ml (6.45 mmol) of butyl ether and 6.4 ml (0.058 mole) of titanium tetrachloride was then added to the product for one-hour treatment at 115° C. After completion of the treatment, the product was subjected to solid-liquid separation and washed twice with 40 ml of toluene at the same temperature. A mixture of 10 ml of toluene, 0.80 (6.45 mmol) of butyl ether, and 6.4 ml (0.058 mole) of titanium tetrachloride was further added to the product for one-hour treatment at 115° C. After completion of the reaction, the product was subjected to solid-liquid separation at the same temperature, washed three times with 40 ml of toluene and another three times with 40 ml of hexane at room temperature, and dried under reduced pressure to obtain 6.58 g of a solid catalyst component. The solid catalyst component thus obtained contained 1.78% by weight of titanium atom, 8.66% by weight of phthalate, 0.1% by weight of ethoxy group, and 0.2% by weight of butoxy group. The solid catalyst component was observed with a substance microscope and showed favorable particle properties free from fine powder. The value of N is shown in Table 1.

(c) Polymerization of propylene

Propylene was polymerized in the same manner as in the step (c) of Example 1, except that the solid catalyst component obtained in the step (b) of Example 7 was used. Conditions and results of polymerization are shown in Table 1.

Comparative Example 2

(b) Synthesis of solid catalyst component

The atmosphere in a 100 ml flask with a stirrer, a dropping funnel and a thermometer was replaced with argon. After 50 ml of the solid product-containing slurry obtained in the step (a) of Example 6 was charged into the flask, 23.5 ml of the supernatant was taken from the slurry, and 1.6 ml (11.1 mmol) of phthaloyl chloride was added to the slurry. The reaction proceeded at 110° C. for 30 minutes. The reaction product was subjected to solid-liquid separation and washed twice with 40 ml of toluene. A mixture of 10 ml of toluene, 0.45 ml (1.7 mmol) of diisobutyl phthalate, 0.8 ml (6.5 mmol) of butyl ether and 16.0 ml (0.146 mole) of titanium tetrachloride was then added to the solid product in the flask for three-hour treatment at 115° C. The reaction product was subjected to solid-liquid separation and washed twice with 40 ml of toluene at the same temperature. A mixture of 10 ml of toluene, 0.8 ml (6.5 mmol) of butyl ether and 8.0 ml (0.073 mole) of titanium tetrachloride was then added to the solid product in the flask for one-hour treatment at 115° C. The reaction product was subjected to solid-liquid separation at the same temperature, washed three times with 40 ml of toluene and another three times with 40 ml of hexane at room temperature, and dried under reduced pressure to obtain 5.8 g of a solid catalyst component. The solid catalyst component thus obtained contained 1.28% by weight of titanium atom, 5.75% by weight of phthalate, 1.2% by weight of ethoxy group, and 0.2% by weight of butoxy group. The value of N is shown in Table 1.

(c) Polymerization of propylene

Propylene was polymerized in the same manner as in the step (c) of Example 1, except that 3.9 mg of the solid catalyst component obtained in the step (b) of Comparative Example 2 was used for polymerization. Conditions and results of polymerization are shown in Table 1.

Comparative Example 3

(b) Synthesis of solid catalyst component

After 23.5 ml of the supernatant was taken from 50 ml of the solid product-containing slurry obtained in the step (a) of Example 6, 1.60 ml (11.1 mmol: 0.20 ml/1 g of solid product) of phthaloly chloride and sebsequently a mixture of 0.80 ml (6.45 mmol) of butyl ether and 16.0 ml (0.146 mole) of titanium tetrachloride were added to the slurry. The slurry was heated to 115° C. and stirred for three hours. After completion of the reaction, the slurry was subjected to solid-liquid separation and washed twice with 40 ml of toluene at the same temperature. A mixture of 10 ml of toluene, 0.45 ml (1.68 mmol) of diisobutyl phthalate, 0.80 ml (6.45 mmol) of butyl ether, and 8.0 ml (0.073 mol) of titanium tetrachloride was added to the product for one-hour treatment at 115° C. The reaction product was subjected to solid-liquid separation at the same temperature, washed three times with 40 ml of toluene and another three times with 40 ml of hexane at room [the same] temperature, and dried under reduced pressure to obtain 7.27 g of a solid catalyst component. The solid catalyst component thus obtained contained 2.29% by weight of titanium atom, 11.03% by weight of phthalate, 0.2% by weight of ethoxy group, and 0.1% by weight of butoxy group. The value of N is shown in Table 1.

(c) Polymerization of propylene

Propylene was polymerized in the same manner as in the step (c) of Example 1, except that the solid catalyst component obtained in the step (b) of Comparative Example 3 was used for polymerization. Conditions and results of polymerization are shown in Table 1.

TABLE 1

Conditions and Results of Polymerization

|  | N | Electron Donor | PP/Cat (g/g) | CXS (wt %) | [η] (dl/g) | Bulk Density (g/ml) |
| --- | --- | --- | --- | --- | --- | --- |
| Example 1 | 6.5 | cHEDMS | 40600 | 0.49 | 1.96 | 0.385 |
| Example 2 | 6.5 | tBnPDMS | 55700 | 0.33 | 2.69 | 0.405 |
| Example 3 | 7.3 | cHEDMS | 46700 | 0.46 | 1.95 | 0.396 |
| Example 4 | 8.5 | cHEDMS | 49100 | 0.50 | 1.90 | 0.399 |
| Example 5 | 8.5 | tBnPDMS | 57500 | 0.47 | 2.67 | 0.406 |
| Example 6 | 10.0 | cHEDMS | 41300 | 0.41 | 1.93 | 0.400 |
| Example 7 | 8.0 | cHEDMS | 51200 | 0.44 | 1.95 | 0.407 |
| Comparative Example 1 | 4.2 | cHEDMS | 30000 | 0.74 | 2.01 | 0.360 |
| Comparative Example 2 | 5.9 | cHEDMS | 7700 | 1.56 | 1.61 | 0.420 |
| Comparative Example 3 | 5.5 | cHEDMS | 25800 | 0.57 | 1.95 | 0.365 | cHEDMS: cyclohexylethyldimethoxysilane
tBnPDMS: tert-butyl-n-propyldimethoxysilane As described above, the present invention provides a solid catalyst component for 60-olefin polymerization having a narrow particle size distribution. The solid catalyst component used in combination with co-catalyst components has high polymerization activity and gives a poly-α-olefin having a high bulk density and favorable particle properties.

What is claimed is:

1. A solid catalyst component for 60-olefin polymerization containing a trivalent titanium compound, obtained by a process which comprises reducing a titanium compound represented by the general formula of $Ti(OR^1)_aX_{4-a}$ (wherein $R^1$ represents a hydrocarbon group having 1 to 20 carbon atoms; X represents a halogen atom; $0 \leq a \leq 4$) with an organomagnesium compound in the presence of an organosilicon compound having an Si—O bond and an ester to obtain a solid product, successively adding a mixture of an ether and titanium tetrachloride and an organic acid halide in this sequence to the solid product for treatment, and further treating the treated solid product with a mixture of an ether and titanium tetrachloride or a mixture of an ether, titanium tetrachloride and an ester.

2. A solid catalyst component according to claim 1, wherein a particle size distribution is not less than 6.0 in terms of the value of N in a Rosin-Rammler function of particle size distribution.

3. A solid catalyst component according to claim 1, wherein the titanium compound is $Ti(OR^1)_4$.

4. A solid catalyst component according to claim 1, wherein the ester is an organic acid ester.

5. A solid catalyst component according to claim 4, wherein the organic acid ester is mono- or poly-valent carboxylic acid ester.

6. A solid catalyst component according to claim 1, wherein the organic acid halide is mono-or poly-valent carboxylic acid halide.

7. A catalyst for 60-olefin polymerization comprising:

(A) a solid catalyst component containing a trivalent titanium compound, obtained by a process which comprises reducing a titanium compound expressed by a general formula of $Ti(OR^1)_aX_{4-a}$ (wherein $R^1$ represents a hydrocarbon group of 1 to 20 carbon atoms; X represents a halogen atom; $0 \leq a \leq 4$) with an organomagnesium compound in the presence of an organosilicon compound having an Si—O bond and an ester to obtain a solid product, successively adding a mixture of an ether and titanium tetrachloride and an organic acid halide in this sequence to the solid product for treatment, and further treating the treated solid product with a mixture of an ether and titanium tetrachloride or a mixture of an ether, titanium tetrachloride and an ester;

(B) an organoaluminum compound; and (C) an electron-donor compound.

8. A catalyst according to claim 7, wherein a particle size distribution in said solid catalyst component (A) is not less than 6.0 in terms of the value of N in a rosin-Rammler function of particle size distribution.

9. A process for producing a poly-α-olefin, which comprises polymerizing an α-olefin with a catalyst comprising:

(A) a solid catalyst component for α-olefin polymerization containing a trivalent titanium compound, obtained by a process which comprises reducing a titanium compound expressed by a general formula of $Ti(OR^1)_aX_{4-a}$ (wherein R1 represents a hydrocarbon group of 1 to 20 carbon atoms; X represents a halogen atom; $0 \leq a \leq 4$) with an organomagesium compound in the presence of an organosilicon compound having an Si—O bond and ester to obtain a solid product, successively adding a mixture of an ether and titanium tetrachloride and an organic acid halide in this sequence to the solid product for treatment, and further treating the treated solid product with a mixture of an ether and titanium tetrachloride or a mixture of an ether, titanium tetrachloride, and an ester;

(B) an organoaluminum compound; and (C) an electron-donor compound.

10. A process according to claim 9, wherein a particle size distribution in said solid catalyst component (A) is not less than 6.0 in terms of the value of N in a Rosin-Rammler function of particle size distribution.

* * * * *